United States Patent [19]
Burkhard

[11] Patent Number: 5,641,948
[45] Date of Patent: Jun. 24, 1997

[54] FORCE MEASURING APPARATUS, PARTICULARLY BALANCE, COMPENSATED FOR OFF-CENTER LOAD APPLICATION

[75] Inventor: Hans-Rudolf Burkhard, Wila, Switzerland

[73] Assignee: Mettler-Toledo AG, Greifensee, Germany

[21] Appl. No.: 168,076

[22] Filed: Dec. 14, 1993

[30] Foreign Application Priority Data

Feb. 22, 1993 [DE] Germany .................... 43 05 426.9

[51] Int. Cl.$^6$ .................................................... G01G 3/00
[52] U.S. Cl. ................................. 177/229; 177/210 EM; 73/862.621
[58] Field of Search ................... 177/229, 210 EM; 73/862.621

[56] References Cited

U.S. PATENT DOCUMENTS

| | | | |
|---|---|---|---|
| 4,128,001 | 12/1978 | Marks | 73/1 B |
| 4,143,737 | 3/1979 | Jacobson | 177/211 |
| 4,453,609 | 6/1984 | Griffen et al. | 117/211 |
| 4,454,770 | 6/1984 | Kistler | 177/229 X |
| 4,653,599 | 3/1987 | Johnson | 177/211 |
| 4,657,097 | 4/1987 | Griffen | 177/211 X |
| 4,798,251 | 1/1989 | Maaz et al. | 177/229 |
| 4,799,561 | 1/1989 | Komoto | 177/229 |
| 4,964,478 | 10/1990 | Stadler et al. | 177/229 |
| 5,191,949 | 3/1993 | Mills et al. | 177/229 |
| 5,340,951 | 8/1994 | Hungerbühler et al. | 177/229 |

FOREIGN PATENT DOCUMENTS

| | | |
|---|---|---|
| 0518202 | 12/1992 | European Pat. Off. . |
| 652207 | 10/1985 | Switzerland . |

*Primary Examiner*—Lincoln Donovan
*Assistant Examiner*—Randy W. Gibson
*Attorney, Agent, or Firm*—Friedrich Kueffner

[57] ABSTRACT

A force measuring apparatus includes a parallelogram guide composed of a fixedly supported parallelogram side member, two parallel guide members which are longitudinally stiff and bending-elastic in the plane of the parallelogram, and an additional parallelogram side member for receiving the force to be measured. The additional parallelogram side member is guided so as to be deflectable in parallel on the fixedly supported parallelogram side member by the guide members. A measuring transformer supplies a signal corresponding to the force to be measured. A device for transmitting at least a portion of the force on the measuring transformer to be measured acting on the deflectably guided parallelogram side member is coupled through the coupling member to the deflectable parallelogram side member. The coupling member is longitudinally stiff and bending-elastic in the plane of the parallelogram and the coupling member includes a localized area which is bending-elastic transversely of the plane of the parallelogram. For suppressing an error due to off-center loading, the axis of the transverse rotation of the deflectable parallelogram side member coincides with a localized transversely bending-elastic portion of the coupling member. In addition, an error caused by a deformation of the parallelogram guide in the plane of the parallelogram is compensated by placing the axis of the longitudinal rotation of the deflectable side member into the longitudinal axis of the coupling member.

18 Claims, 2 Drawing Sheets ns. The present invention further relates to a method of
FORCE MEASURING APPARATUS, PARTICULARLY BALANCE, COMPENSATED FOR OFF-CENTER LOAD APPLICATION

BACKGROUND OF THE INVENTION

1. Field of the Invention

The present invention relates to a force measuring apparatus, particularly a balance. The force measuring apparatus includes a parallelogram guide means with a fixedly supported parallelogram side member, two parallel guide members which are longitudinally stiff and bending-elastic in the plane of the parallelogram, and an additional parallelogram side member for receiving the force to be measured. The additional parallelogram side member is guided so as to be deflectable in parallel on the fixedly supported parallelogram side member by means of the guide members. The apparatus further includes a measuring transformer for supplying a signal corresponding to the force to be measured and a device serving for transmitting at least a portion of the force on the measuring transformer to be measured which acts on the deflectably guided parallelogram side member, wherein this device is coupled by means of a coupling member to the deflectable parallelogram-side member, and wherein the coupling member is longitudinally stiff and bending-elastic in the plane of the parallelogram and the coupling member includes a localized area which is bending-elastic transversely of the plane of the parallelogram. The present invention further relates to a method of manufacturing such a force measuring apparatus.

2. Description of the Related Art

In a balance of the above-described type known from U.S. Pat. No. 4,799,561, whose measuring transformer is based on the known principle of electromagnetic force compensation and whose force transmitting device is formed by a lever which extends between the coupling member and the moving coil of the electromagnetic force compensation system, measurement errors are to be avoided by means of the area of the coupling member which is bending-elastic transversely of the parallelogram plane, wherein the measuring errors are caused by a torque produced by the load to be weighed in the plane extending perpendicularly to the plane of the parallelogram. These torques are produced when the load to be weighed is placed on a weighing dish connected to the deflectably guided parallelogram side member laterally offset from the center of the deflectably guided parallelogram side member in the plane extending perpendicularly to the plane of the parallelogram. Twisting of the parallelogram guide means caused by this torque in the plane perpendicular to the plane of the parallelogram, particularly of the deflectably guided parallelogram side member receiving the weight force to be measured, is to be absorbed in the known balance by the area of the coupling member which is bending-elastic transversely of the plane of the parallelogram and, as a result, a transmission of the twisting to the lever and to the measuring transformer is to be avoided. Although one could assume that this known measure solves the problem of lateral torques which act on the parallelogram guide means and depend on the load application, however, upon closer examination, it has been found that, for the purposes of high resolution balances, it is not possible to sufficiently suppress off-center load errors by merely providing at any location a localized area which is bending-elastic transversely of the plane of the parallelogram.

A coupling member of a different type which is bending-elastic in the plane of the parallelogram as well as transversely of the plane of the parallelogram is known from CH-A5-652 207. In this coupling member, the bending elasticities transversely of the plane of the parallelogram and in the plane of the parallelogram are localized immediately next to each other at each end portion of the coupling member, while the portion of the coupling member between these two pairs of bending elasticities at the end portions is stiff with respect to bending and has a substantially greater material thickness than the end portions. However, particularly in high resolution balances, it is not possible to sufficiently suppress the off-center load errors by merely arranging at the ends of the coupling member two localized areas which are bending-elastic transversely of the plane of the parallelogram.

SUMMARY OF THE INVENTION

Therefore, it is the primary object of the present invention to further develop a force measuring apparatus, particularly a balance, of the above-mentioned type in such a way that errors caused by the force to be measured acting laterally offset relative to the plane of the parallelogram are suppressed more strongly. It is another object of the present invention to provide a method of manufacturing such a force measuring apparatus.

In accordance with the present invention, the above-described object is met by arranging the area of the coupling member which is bending-elastic transversely of the plane of the parallelogram into the region of the axis of the transverse rotation of the deflectably guided parallelogram side member which occurs in the case of an eccentrically applied load in the plane extending perpendicularly to the plane of the parallelogram.

Accordingly, the present invention is based on the finding that the problem of errors due to off-center load cannot be satisfactorily solved merely by providing an area in the coupling member which is bending-elastic transversely of the plane of the parallelogram and by a certain predetermination of the location of the localized bending-elastic area in the coupling member. Rather, a further decisive factor is the relationship of the locations between the axis of the transverse rotation of the parallelogram guide means in the case of off-center load and the spatial location of the area of the coupling member which is bending-elastic transversely to the plane of the parallelogram. In accordance with the invention, the axis of the transverse rotation must coincide as precisely as possible with the area of the coupling member extending transversely of the plane of the parallelogram. This results in a substantial further reduction of the errors due to off-center load produced in the force measuring apparatus, particularly the balance.

In accordance with a preferred embodiment of the force measuring apparatus, the guide members are constructed with a mutual deviation from symmetry which causes the area which is bending-elastic transversely of the plane of the parallelogram to coincide with the axis of the transverse rotation. Accordingly, the requirement that the area which is bending-elastic transversely of the plane of the parallelogram coincides at least approximately with the axis of the transverse rotation of the deflectably guided parallelogram side member, which is generally not met, can be achieved by constructing the two parallelogram side members in the parallelogram guide means asymmetrically relative to each other. This deviation from symmetry is dimensioned in such a way that the axis of the transverse rotation and the bending-elastic area coincide as desired. If the guide members have a uniform cross section over the entire length thereof, i.e., the bending elasticity of the guide members is distributed uniformly over the entire length thereof, the required deviation from symmetry can be adjusted by selecting the material thicknesses of the two guide members different from each other in the plane of the parallelogram. In this case, the ratio of the two distances between the axis of transverse rotation and the two parallelogram guide members is equal to the reciprocal of the ratio of the material thicknesses thereof. More generally, this distance ratio is equal to the reciprocal of the ratio of the spring constants of the two guide members transversely of the plane of the parallelogram. In embodiments which higher resolutions, the bending elasticity of the guide members is concentrated in the bending-elastic areas formed at the ends by reduced thickness portions of the material of the guide members. In this case, the desired asymmetry is preferably produced by constructing the reduced thickness portions of one guide member with a different thickness than the reduced thickness portions of the other guide member.

In accordance with a further useful development, the area of the coupling member which is bending-elastic transversely of the plane of the parallelogram is placed in the middle area of its longitudinal axis extending parallel to the deflectably guided parallelogram side member. Accordingly, the coupling member is constructed symmetrically with respect to the bending-elastic area arranged in the middle of the longitudinal extension thereof. This is advantageous for the function of the coupling member as a disturbance-free transmission connection of the force to be measured from the deflectably guided parallelogram side member to the force transmission device. Although generally this central portion of the coupling member does not coincide with the axis of the transverse rotation of the parallelogram guide means, this can be achieved by the intentional deviation from symmetry of the parallelogram guide means.

An additional measuring error is superimposed over the measuring error caused by the off-center load problem. This additional measuring error occurs simultaneously with and independently of the off-center load error and is caused by the fact that a symmetry-disturbing deformation of the parallelogram guide means occurs in the plane of the parallelogram which causes a deviation of the effective corner points of the parallelogram guide means from the corner points of an ideal parallelogram shape. As a result of this disturbance of the symmetry, the deflectably guided parallelogram side member no longer travels on a strictly straight path extending parallel to the fixedly supported parallelogram side member, but is rather additionally subjected to a slight longitudinal rotation in the plane of the parallelogram. As was found within the framework of the present invention, the component of the measuring error caused by this disturbance of the symmetry can be substantially reduced by arranging the axis of a longitudinal rotation of the deflectably guided parallelogram side member in the plane of the parallelogram when a load is applied into the region of the longitudinal axis of the coupling member which extends parallel to the deflectably guided parallelogram side member.

In accordance with a structurally particularly simple feature for obtaining the desired relationship of location between the axis of the longitudinal rotation and the longitudinal axis of the coupling member, the parallelogram guide means has a symmetry deviation from a strict parallelogram shape which causes the axis of the longitudinal rotation to coincide with the region of the longitudinal axis of the coupling member. Consequently, only at least one corner point of the parallelogram guide means must be displaced in a suitable manner from the location corresponding to a strict parallelogram shape, in order to produce the desired relationship of locations of the respective axes.

The computations required for determining the location of the axes of transverse and longitudinal rotation discussed above can be found in W. Beitz and K. H. Küttner Dubbel, Taschenbuch für den Maschinenbau, Berlin, Germany, Springer (1983) C: Festigkeitslehre [Strength of materials]: 2. Beanspruchung stabförmiger Bauteile [loading of rod-shaped components] (pages 185–211).

Although the invention utilizes the basic concept of the production of a suitable relationship of the locations between the axis of the transverse rotation and the area which is bending-elastic transversely of the plane of the parallelogram and, therefore, does not depend on whether the bending elasticity of the coupling member in the plane of the parallelogram is distributed over the entire longitudinal extension of the coupling member or is localized, a useful embodiment of the present invention provides that the bending elasticity of the coupling member provided in the plane of the parallelogram is concentrated in bending points localized in the end regions thereof, wherein the coupling member is connected to the deflectably guided parallelogram side member through one of the bending points and the coupling member is connected to the force transmitting device through the other of the bending points. On the one hand, this localization of the bending points which provides the bending elasticity of the coupling member in the plane of the parallelogram produces defined geometric conditions. On the other hand, when these localized bending points are arranged within the overall force measuring apparatus, it is possible to finish the apparatus with particular care and accuracy in order to obtain a bending behavior which is as favorable as possible.

Moreover, it is advantageous in this connection that the axis of the longitudinal rotation is arranged in the region of one of the localized bending points. This leads to a particularly strong suppression of the measuring errors caused by the longitudinal rotation of the parallelogram side member when the parallelogram guide means is deformed in the plane of the parallelogram.

In accordance with an embodiment of the apparatus according to the present invention which is particularly important in practical use, the parallelogram guide means, the coupling member and the force transmitting device are formed by material portions of a single-piece material block, wherein the material portions are defined by material-free areas formed by cutouts extending through the material block perpendicularly to the plane of the parallelogram. Accordingly, the apparatus is formed by a single-piece material block which requires no assembly of individual components and especially no adjustments of the individual components relative to each other. In contrast, the apparatus can be constructed much more advantageously by producing material-free areas, for example, by electric erosion or spark machining starting with a block of solid material.

In advantageous further developments of such single-piece constructions, the respective bending elasticities are realized by forming the bending-elastic areas by reduced thickness points of the respective material portions.

In accordance with another embodiment of the force measuring apparatus according to the present invention, particularly a balance, which is important in practical use, the force to be measured acting on the deflectably guided parallelogram side member is subjected to a force transformation, particularly a stepping down transformation.

In this embodiment, it is particularly provided that the force transmitting device has at least one lever arranged between the coupling member and the measuring transformer.

The present invention also relates to a method of manufacturing a force measuring apparatus, particularly a balance, which includes a parallelogram guide means with a fixedly supported parallelogram side member, two parallel guide members which are longitudinally stiff and bending-elastic in the plane of the parallelogram, and a parallelogram side member for receiving the force to be measured which is guided on the fixedly supported parallelogram side member so as to be deflectable in parallel, a measuring transformer for producing a signal corresponding to the force to be measured, and a device for transmitting at least a portion of the force to be measured acting on the measuring transformer and applying a load on the deflectably guided parallelogram side member, wherein the device is coupled to the deflectable parallelogram side member by means of a longitudinally stiff coupling member which is bending-elastic in the plane of the parallelogram and has a localized area which is bending-elastic transversely of the plane of the parallelogram plane, wherein the method includes the steps of placing the area of the coupling member which is bending-elastic transversely of the plane of the parallelogram plane in a predetermined location on the longitudinal axis of the coupling member which is parallel to the deflectably guided parallelogram side member and placing the axis of a transverse rotation of the deflectably guided parallelogram side member occurring in the case of an off-center load application in the plane extending perpendicularly to the plane of the parallelogram into the area of the predetermined location by a mutually asymmetrical configuration of the two guide members.

Accordingly, the method according to the present invention provides for selecting in a suitable manner initially the location of the area in the coupling member which is bending-elastic transversely of the plane of the parallelogram and adjusting the axis of the transverse rotation of the parallelogram guide means in dependence on the previously selected location of the bending-elastic area. The latter is easily possible by constructing the two guide members not equally, but asymmetrically, for example, by providing one of the guide members with a greater cross-section than the other guide member. This method according to the present invention produces a configuration of the force measuring apparatus in which errors due to off-center load are substantially reduced.

In accordance with a preferred embodiment of the method, the predetermined location is placed in the middle of the longitudinal axis of the coupling member. In the force measuring apparatus resulting from this method, the coupling member is symmetrical with respect to the area which is bending-elastic transversely of the plane of the parallelogram.

In accordance with another method of manufacturing a force measuring apparatus according to the present invention, particularly a balance, which includes a parallelogram guide means with a fixedly supported parallelogram side member, two parallel guide members which are longitudinally stiff and bending-elastic in the plane of the parallelogram, and a parallelogram side member for receiving the force to be measured which is guided on the fixedly supported parallelogram side member so as to be deflectable in parallel, a measuring transformer for producing a signal corresponding to the force to be measured, and a device for transmitting at least a portion of the force to be measured acting on the measuring transformer and applying a load on the deflectably guided parallelogram side member, wherein the device is coupled to the deflectable parallelogram side member by means of a longitudinally stiff coupling member which is bending-elastic in the plane of the parallelogram and has a localized area which is bending-elastic transversely of the plane of the parallelogram plane, wherein the method includes the steps of placing the axis of the longitudinal rotation of the deflectably guided parallelogram side member occurring in the plane of the parallelogram under load into the region of the longitudinal axis of the coupling member by providing the parallelogram guide means with a shape which deviates from the strict parallelogram symmetry.

Accordingly, in this method, the geometry of the parallelogram guide means is slightly disturbed in order to deviate from the strict parallelogram symmetry, for example, by shifting at least one of the effective parallelogram corners relative to the strict parallelogram shape, wherein this disturbance of the symmetry is dimensioned in such a way that the axis of the longitudinal rotation of the deflectably guided parallelogram side member which receives the force to be measured is shifted into the region of the longitudinal axis of the coupling member. It has been found that this configuration makes it possible to suppress the measuring errors caused by the longitudinal rotation to a very small value.

It is to be pointed out that this method, as well as the corresponding structural features, can be utilized independently of the measures carried out in connection with the compensation of errors due to off-center load. In other words, if errors due to off-center load are not to be eliminated simultaneously, the coupling member does not have to have bending-elasticity transversely of the plane of the parallelogram.

The most favorable manner of carrying out the method is to produce the bending elasticity of the coupling member in the plane of the parallelogram by localized bending points at the end portions of the coupling member and placing the axis of the longitudinal rotation into one of these localized bending points of the coupling member.

The various features of novelty which characterize the invention are pointed out with particularity in the claims annexed to and forming a part of the disclosure. For a better understanding of the invention, its operating advantages, specific objects attained by its use, reference should be had to the drawing and descriptive manner in which there are illustrated and described a preferred embodiment of the invention.

DESCRIPTION OF THE PREFERRED EMBODIMENT

Figure 1:
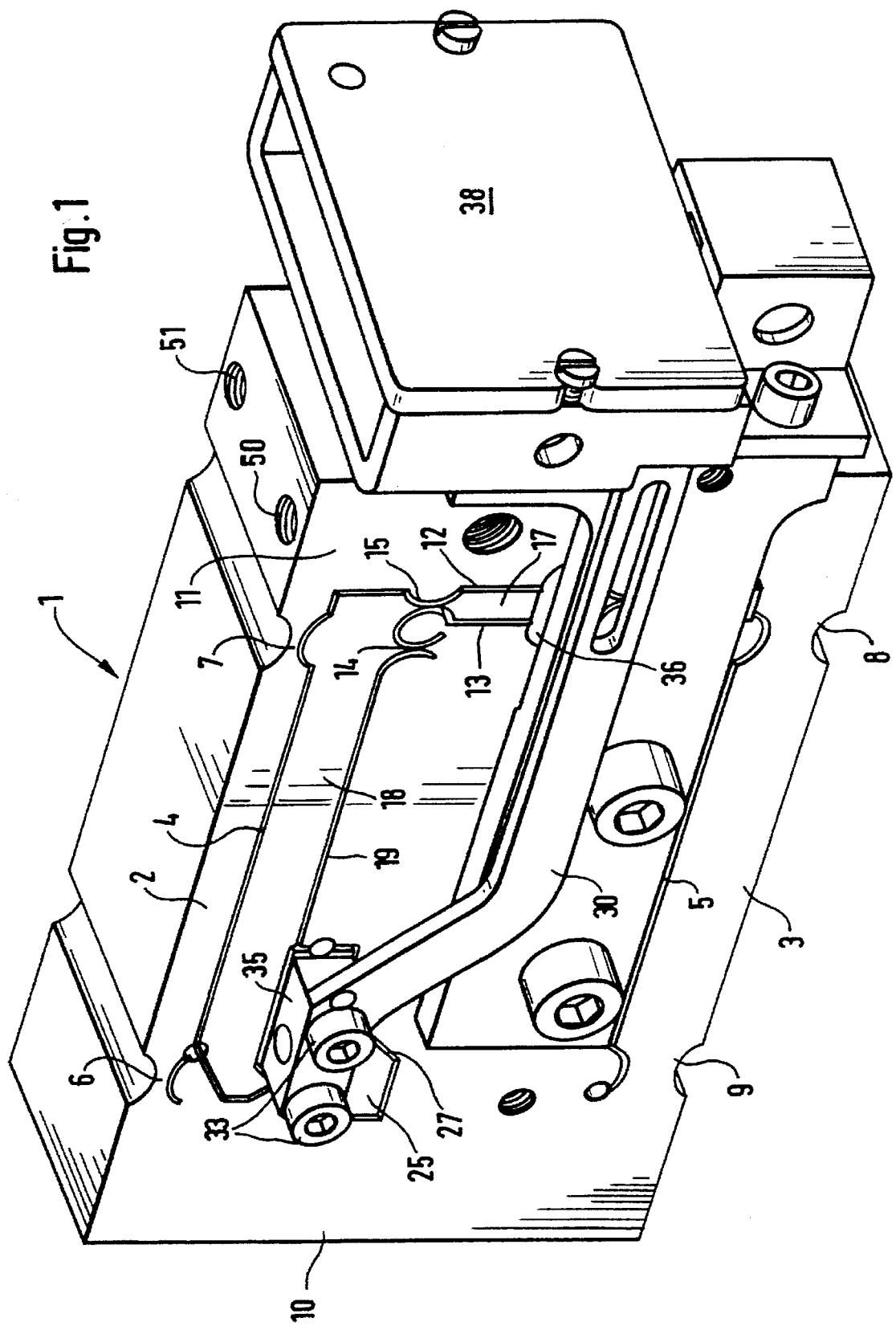
FIG. 1 is a perspective view of an embodiment of a balance according to the present invention, wherein the weighing dish and the house of the balance are removed.
Figure 2:
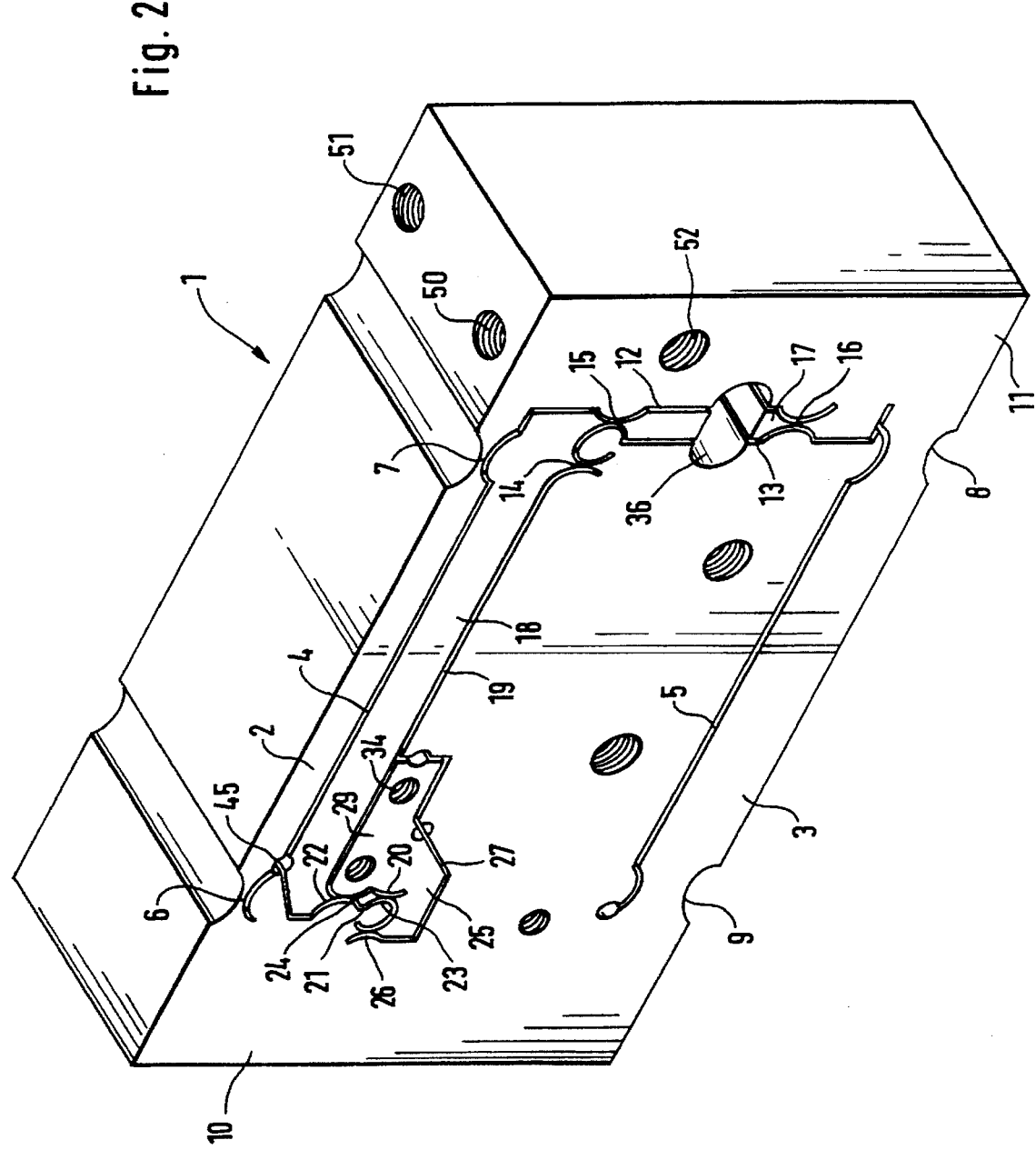
FIG. 2 is a perspective view of the embodiment of FIG. 1, wherein the measuring transformer has been removed.

As illustrated in FIGS. 1 and 2, a balance composed of a single-piece material block 1 is divided into several material portions which are defined by material-free areas within the material block 1. The material-free areas are formed by cutouts of the material block 1 which extend completely through the material block 1 perpendicularly of the principal plane which, as seen in FIGS. 1 and 2 of the drawing, faces the viewer of the drawing. In the illustrated embodiment, these material-free areas are in the form of thin cutting lines obtained, for example, by electrical erosion. Because this method removes a minimum amount of material, and because of the given dimensions of the material block 1, these material portions have a highest possible strength, particularly stiffness to bending. Accordingly, even though it is very advantageous to obtain the material-free portions in the form of thin cutting lines, it is alternatively possible that the material-free areas have substantially greater cross-sections which is the case, for example, when they are manufactured by cutting operations, for example, milling.

The material-free areas produce in the material block 1 a parallel guide means whose parallelogram side members are defined by two parallel, longitudinally stiff guide members 2, 3 which are bending-elastic in the plane of the parallelogram, and on one side by the respective outer edge of the rectangular material block 1 and on the inner side by a material free portion 4 and 5, respectively. The material-free portions 4, 5 which extend in the form of thin cutting lines parallel to the two longer sides of the rectangle, are convexly arched in the end areas thereof toward the respectively adjacent longitudinal edge of the material block 1, wherein the material block 1 has complimentary inwardly directed arches opposite these convex outwardly directed arches of the material-free portions 4, 5.

The reduced thickness points of the material block formed between respectively opposite inwardly directed arches and outwardly directed arches are located on the four corner points of the parallelogram shape which geometrically determines the parallelogram guide means. A parallelogram side member 10 extends transversely of the longitudinal direction of the guide members 2, 3. In a manner which is not illustrated in detail, the parallelogram side member 10 is fixedly supported on a stand or a base plate of the balance. A parallelogram side member 11 located opposite the parallelogram side member 10 and on the other side of the other bending points 7, 8 is guided so as to be deflectable in parallel on the fixedly supported parallelogram side member 10 by means of the guide members 2, 3. This parallelogram side member 11 which can be deflected in parallel receives a force to be measured, for example, the force of a weight to be weighed, wherein the introduction of the force to be measured is carried out with the intermediate arrangement of a weighing dish, not shown, which carries the weight. For fastening the weighing dish, the parallelogram side member 11 which is deflectable in parallel is provided with threaded bores 50, 51 and 52.

One side of the deflectable parallelogram side member 11 is formed by the shorter side of the rectangle which extends transversely of the longer sides of the rectangle. On its other side facing the interior of the material block 1, the side of the deflectable parallelogram side member 11 is formed by a material-free area 12 which extends parallel to the shorter side of the rectangle and which is also in the form of a thin cutting line and is convexly arched toward the fixedly supported parallelogram side member 11 at two locations which are spaced apart from each other. While the material-free area 12 ends in the convex arch facing the bending point 8, the material-free area 12 is connected on the other side of the convex arch facing the bending point 7 to the material-free area 4.

Oppositely located of the two convex arches of the material-free area 12 are two complimentary arches which are convex toward the deflectable parallelogram side member 11 of a material-free area 13 which otherwise extends parallel to the material-free area 12. On the other side of the arch facing the bending point 8, the material-free area 13 continues into the material-free area 5 which defines the guide member 3. On the other side of the other arch facing toward the bending point 7, the material-free area 13 is continued in an arch shape in such a way that it forms a bending point 14 serving as the support point for a lever 18 of a force transmitting device on the side facing the displaceable parallelogram side member 11.

Accordingly, the material-free areas 12 and 13, between whose arches which are oppositely arranged in pairs are formed reduced thickness portions of the material block 1 as bending points 15, 16, define therebetween a coupling member 17, wherein one end portion of the coupling member 17 which includes the bending point 16 is connected to the deflectable parallelogram side member 11, and the other end portion forming the bending point 15 is connected to the lever 18 of the force transmitting device which is stationarily supported on the bending point 14.

In addition to the lever 18 which is defined on its side of the bending point 14 opposite the bending point 15 by a material-free area 19 also in the form of a thin cutting line, the force transmitting device has an additional lever 25 which is supported on a bending point 26 and is coupled through another coupling member 21 including two bending points 22, 23 to the lever 18 on the end thereof opposite the deflectable parallelogram side member 11. As is the case in lever 18 and coupling member 17, the additional lever 25, the additional coupling member 21 and the bending points 22, 23 and 26 are formed by material-free areas 20, 24 and 27 formed by the thin cutting line.

As shown in the drawing, in the force transmitting device, the lever 18 and the additional lever 25 are stationarily supported in the material block 1 by means of the bending points 14 and 26, respectively. The force to be measured which is introduced into the deflectable parallelogram side member 11 acts as a tensile force on the coupling member 17 which is connected therewith through the bending point 16 and which, in turn, acts on the lever 18 through the bending point 15. This causes the lever 18 to transform the force in a stepping-down sense in the ratio of its lever arm lengths determined by the distance between the bending point 15 and the bending point 14 serving as a support point, on the one hand, and between the bending point 14 and the bending point 22 serving as the contact point of the additional coupling member 21, on the other hand. The transformed force is transmitted by the additional coupling member 21 which acts under tension to the additional lever 25 through the bending point 23 which acts as the contact point on the additional lever 25.

On the free lever arm 29 of the additional lever 25 opposite the bending point 26 on the other side of the bending point 23 are mounted on both sides of the material block 1 the free ends of the side members 30 of a U-shaped cantilever shown in FIG. 1 by means of threaded bolts 33 in threaded bores 34 of the free lever arm 29. Lateral spacer members 35 ensure that the side members 30 can follow the movement of the additional lever 25 without contacting the material block 1.

On a web member connecting the side members 30 on the end thereof facing away from the additional lever 25 is mounted a compensation coil for a force compensation system serving as a measuring transformer in such a way that it is immersed in a magnetic field produced by a magnet arrangement 38. A control circuit controls the compensation current for the compensation coil in such a way that it is always returned into its zero position, wherein a control signal for the compensation coil produced by a position sensor serves as the input value for the control circuit. Consequently, the compensation current represents the signal corresponding to the force to be measured.

Accordingly, in the illustrated embodiment, the force transmitting device is formed by connecting in series the lever 18 and the additional lever 25 by means of the additional coupling member 21 and the measuring transformer is formed by an electromagnetic force compensation system. Alternatively, other measuring transformers with short travel distances, such as, vibrating strings, and other force transmitting devices, particularly systems with only one lever, can be used.

The longitudinally stiff coupling member 17 and the longitudinally stiff additional coupling member 21 are bending-elastic in the plane of the parallelogram as a result of the bending points 15, 16, and 22, 23, respectively. Instead of these localized bending points 15, 16 and 22, 23 provided at the end portions of the coupling member 17 and the additional coupling member 21, respectively, it is alternatively possible to produce the bending elasticity in the plane of the parallelogram by constructing the coupling members 17 and 21 to be bending-elastic in the parallelogram plane continuously over the entire length thereof in the manner of a plate spring. Similarly, the bending elasticity of the guide members 2, 3, instead of being concentrated at the bending points 6, 7, 8, 9, could be distributed over the entire length of the guide members 2, 3. In accordance with FIGS. 1 and 2 of the drawing, on the other hand, the coupling member 17 is provided with a localized area 36 which is bending-elastic transversely of the plane of the parallelogram and the coupling member 17 is otherwise constructed bending stiff transversely of the plane of the parallelogram. In particular, in the embodiment illustrated in FIGS. 1 and 2, this bending-elastic area 36 of the coupling member 17 is arranged on its longitudinal extension between the bending points 15 and 16, and the area 36 is formed by reducing the material thickness thereof from the two principal planes of the rectangular material block by a recess each perpendicularly of these principal planes forming the parallelogram plane. As a result of the bending elasticity of the coupling member 17 achieved in the plane perpendicular to the plane of the parallelogram, it is, therefore, possible to compensate by the coupling member 17 a transverse rotation of the deflectable parallelogram side member 11 in the plane perpendicular to the plane of the parallelogram, in order to keep the attendant error influences away from the force transmitting device and the measuring transformer. Such a transverse rotation must always be expected when the weight has been placed on the weighing dish off-center relative to the deflectable parallelogram side member 11, i.e., when a force introduction which is laterally offset relative to the plane of the parallelogram exerts a torque on the deflectable parallelogram side member 11 in the plane perpendicular to the plane of the parallelogram.

However, for suppressing this error due to off-center load as much as possible, it is of decisive importance that the localized bending-elastic area 36 of the coupling member 17 coincides as exactly as possible with the axis of the transverse rotation of the deflectable parallelogram side member 11. Since, on the other hand, the localized bending-elastic area 36 is placed at a certain predetermined location of the longitudinal extension of the coupling member 17 extending with its longitudinal axis parallel to the deflectable parallelogram side member 11, it is, therefore, necessary to use the remaining geometry of the parallelogram guide means to cause the bending-elastic area 36 to coincide with the axis of the transverse rotation. This can be made possible by an appropriate deviation from symmetry of the two guide members 2, 3 which guide the deflectable parallelogram side member 11. In particular, in the embodiment illustrated in FIGS. 1 and 2, as a result of the geometry of the parallelogram guide means and the force transmitting device, the distance between the localized bending-elastic area 36 and the lower guide member 3 is smaller than the distance between the localized bending-elastic area 36 and the upper guide member 2. The deviation from symmetry of the guide members 2, 3 which causes the axis of the transverse rotation to coincide with the localized bending-elastic area 36 is obtained by constructing the upper guide member 2 with an appropriately thinner cross section as compared to the lower guide member 3, i.e., the upper guide member 2 has a smaller thickness than the lower guide member 3 in the direction of the shorter rectangle sides of the material block 1 as shown in FIGS. 1 and 2 of the drawing.

In addition to the error due to off-center load which is suppressed by the localized bending-elastic area 36 of the coupling member 17 and because the position of the area 36 coincides with the axis of the transverse rotation, an additional error may occur when a load is applied as a result of the deformation of the guide members 2, 3 taking place in the plane of the parallelogram because, as a result of this deformation, the deflectable parallelogram side member 11 no longer moves strictly parallel to the stationarily supported parallelogram side member 10, but rather carries out additionally a slight longitudinal rotation in the plane of the parallelogram. In order to reduce this error to a minimum, the geometry of the parallelogram guide means is selected in such a way that the axis of this longitudinal rotation is located in the area 36 of the longitudinal axis of the coupling member 17. In particular, in the embodiment illustrated in FIGS. 1 and 2, in which the bending elasticity of the coupling member 17 is concentrated in the plane of the parallelogram in the two localized bending points 15, 16, the axis of this longitudinal rotation is placed in the lower bending point 16. This positioning of the axis is achieved by a slight deviation of the symmetry of the parallelogram guide means from the strict parallelogram shape. However, in the illustration of FIGS. 1 and 2, this deviation from symmetry is not visible because the deviation is very slight. In particular, for producing this deviation from symmetry, at least one of the bending points 6, 7, 8 and 9 forming the corner points of the parallelogram are slightly offset from the position determining a strict parallelogram shape.

The invention is not limited by the embodiments described above which are presented as examples only but can be modified in various ways within the scope of protection defined by the appended patent claims.

I claim:

1. A force measuring apparatus comprising a parallelogram guide means, the parallelogram guide means defining a plane, the parallelogram guide means comprising a fixedly supported parallelogram side member, two parallel guide members which are longitudinally stiff and bending-elastic in the plane of the parallelogram, and a deflectable parallelogram side member for receiving a force to be measured, the deflectable parallelogram side member being guided so as to be deflectable in parallel on the fixedly supported parallelogram side member by means of the guide members, the apparatus further comprising a measuring transformer for supplying a signal corresponding to the force to be measured, a device for transmitting at least a portion of the force to be measured on the measuring transformer acting on the deflectably guided parallelogram side member, a coupling member for coupling the device to the deflectable parallelogram side member, wherein the coupling member is longitudinally stiff and bending-elastic in the plane of the parallelogram and the coupling member comprises a localized area which is bending-elastic transversely of the plane of the parallelogram, wherein an eccentrically applied load results in a transverse rotation of the deflectable parallelogram side member in a plane extending perpendicularly to the plane of the parallelogram guide means about an axis, and wherein the localized area is located in the region of the axis of the transverse rotation.

2. The force measuring apparatus according to claim 1, wherein the guide members comprise a symmetry deviation, such that the localized area coincides with the axis of the transverse rotation.

3. The force measuring apparatus according to claim 1, wherein the coupling member has a longitudinal axis extending parallel to the deflectable parallelogram side member, and wherein the localized area of the coupling member is located in a middle portion of the longitudinal axis thereof.

4. A force measuring apparatus comprising a parallelogram guide means, the parallelogram guide means defining a plane, the parallelogram guide means comprising a fixedly supported parallelogram side member, two parallel guide members which are longitudinally stiff and bending-elastic in the plane of the parallelogram, and a deflectable parallelogram side member for receiving a force to be measured, the deflectable parallelogram side member being guided so as to be deflectable in parallel on the fixedly supported parallelogram side member by means of the guide members, the apparatus further comprising a measuring transformer for supplying a signal corresponding to the force to be measured, a device for transmitting at least a portion of the force to be measured on the measuring transformer acting on the deflectably guided parallelogram side member, a coupling member for coupling the device to the deflectable parallelogram side member, wherein the coupling member is longitudinally stiff and bending-elastic in the plane of the parallelogram and the coupling member comprises a localized area which is bending-elastic transversely of the plane of the parallelogram, wherein a load application results in a longitudinal rotation in the plane of the parallelogram about an axis, wherein the coupling member has a longitudinal axis extending parallel to the deflectable parallelogram side member, and wherein the axis of the longitudinal rotation is located in the region of the longitudinal axis of the coupling member.

5. The force measuring apparatus according to claim 4, wherein the parallelogram guide means comprises a symmetry deviation from a strict parallelogram shape, such that the axis of the longitudinal rotation coincides with the region of the longitudinal axis of the coupling member.

6. The force measuring apparatus according to claim 1, wherein the coupling member has end portions, the bending elasticity of the coupling member being concentrated in first and second localized bending points in the end portions of the coupling member, wherein the first bending point connects the coupling member to the deflectable parallelogram side member and the second bending point connects the coupling member to the force transmitting device.

7. The force measuring apparatus according to claim 4, wherein the coupling member has end portions, the bending elasticity of the coupling member being concentrated in first and second localized bending points in the end portions of the coupling member, wherein the first bending point connects the coupling member to the deflectable parallelogram side member and the second bending point connects the coupling member to the force transmitting device.

8. The force measuring apparatus according to claim 6, wherein the axis of longitudinal rotation is located in the region of one of the localized bending points.

9. The force measuring apparatus according to claim 1, comprising a material block having material-free areas extending through the material block perpendicularly of the plane of the parallelogram guide means, the material-free areas defining the parallelogram guide means, the coupling member and the force transmitting device.

10. The force measuring apparatus according to claim 4, comprising a material block having material-free areas extending through the material block perpendicularly of the plane of the parallelogram guide means, the material-free areas defining the parallelogram guide means, the coupling member and the force transmitting device.

11. The force measuring apparatus according to claim 9, wherein the bending-elastic areas are formed by reduced thickness portions of the material block.

12. The force measuring apparatus according to claim 10, wherein the bending-elastic areas are formed by reduced thickness portions of the material block.

13. The force measuring apparatus according to claim 1, further comprising at least one lever mounted between the coupling member and the measuring transformer.

14. A method of manufacturing a force measuring apparatus, the force measuring apparatus including a parallelogram guide means, the parallelogram guide means defining a plane, the parallelogram guide means including a fixedly supported parallelogram side member, two parallel guide members which are longitudinally stiff and bending-elastic in the plane of the parallelogram, and a deflectable parallelogram side member for receiving a force to be measured, the deflectable parallelogram side member being guided so as to be deflectable in parallel on the fixedly supported parallelogram side member by means of the guide members, the apparatus further including a measuring transformer for supplying a signal corresponding to the force to be measured, a device for transmitting at least a portion of the force to be measured on the measuring transformer acting on the deflectably guided parallelogram side member, a coupling member for coupling the device to the deflectable parallelogram side member, wherein the coupling member is longitudinally stiff and bending-elastic in the plane of the parallelogram and the coupling member includes a localized area which is bending-elastic transversely of the plane of the parallelogram, the method comprising the steps of placing the area of the coupling member which is bending-elastic transversely of the plane of the parallelogram plane in a predetermined location on the longitudinal axis of the coupling member which is parallel to the deflectably guided parallelogram side member, and placing the axis of a transverse rotation of the deflectably guided parallelogram side member occurring as a result of an off-center load application in the plane extending perpendicularly to the plane of the parallelogram into the area of the predetermined location by a mutually asymmetrical configuration of the two guide members.

15. The method according to claim 14, wherein the longitudinal axis of the coupling member has a middle, the method further comprising placing the predetermined location in the middle of the longitudinal axis of the coupling member.

16. A method of manufacturing a force measuring apparatus, the force measuring apparatus including a force measuring apparatus including a parallelogram guide means, the parallelogram guide means defining a plane, the parallelogram guide means comprising a fixedly supported parallelogram side member, two parallel guide members which are longitudinally stiff and bending-elastic in the plane of the parallelogram, and a deflectable parallelogram side member for receiving a force to be measured, the deflectable parallelogram side member being guided so as to be deflectable in parallel on the fixedly supported parallelogram side member by means of the guide members, the apparatus further including a measuring transformer for supplying a signal corresponding to the force to be measured, a device for transmitting at least a portion of the force to be measured on the measuring transformer acting on the deflectably guided parallelogram side member, a coupling member for coupling the device to the deflectable parallelogram side member, wherein the coupling member is longitudinally stiff and bending-elastic in the plane of the parallelogram and the coupling member has a localized area which is bending-elastic transversely of the plane of the parallelogram, the method comprising the steps of placing the axis of the longitudinal rotation of the deflectably guided parallelogram side member occurring in the plane of the parallelogram under load into the region of the longitudinal axis of the coupling member by providing the parallelogram guide means with a shape which deviates from strict parallelogram symmetry.

17. The method according to claim 16, further comprising effecting the bending elasticity of the coupling member in the plane of the parallelogram by localized bending points in end portions of the coupling member and placing the axis of the longitudinal rotation in one of the localized bending points of the coupling member.

18. The force measuring apparatus according to claim 4, further comprising at least one lever mounted between the coupling member and the measuring transformer.

* * * * *